United States Patent
Ostroumova et al.

(10) Patent No.: US 9,692,804 B2
(45) Date of Patent: Jun. 27, 2017

(54) METHOD OF AND SYSTEM FOR DETERMINING CREATION TIME OF A WEB RESOURCE

(71) Applicant: YANDEX EUROPE AG, Lucerne (CH)

(72) Inventors: Liudmila Alexandrovna Ostroumova, Yaroslavl (RU); Egor Aleksandrovich Samosvat, Moscow (RU); Petr Vladislavovich Prokhorenkov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 14/703,314

(22) Filed: May 4, 2015

(65) Prior Publication Data

US 2016/0004674 A1 Jan. 7, 2016

Related U.S. Application Data

(63) Continuation of application No. PCT/IB2014/066333, filed on Nov. 25, 2014.

(30) Foreign Application Priority Data

Jul. 4, 2014 (RU) ................................ 2014127288

(51) Int. Cl.
*G06F 17/30* (2006.01)
*H04L 29/08* (2006.01)

(52) U.S. Cl.
CPC .......... *H04L 67/02* (2013.01); *G06F 17/3089* (2013.01)

(58) Field of Classification Search
CPC ... G06F 17/22; G06F 17/2235; G06F 17/2241
(Continued)

(56) References Cited

U.S. PATENT DOCUMENTS

| 6,735,694 B1 | 5/2004 | Berstis et al. |
| 7,191,400 B1 | 3/2007 | Buvac et al. |

(Continued)

FOREIGN PATENT DOCUMENTS

| CN | 103257989 A | 8/2013 |
| EP | 2610767 A1 | 7/2013 |

(Continued)

OTHER PUBLICATIONS

Nunes et al., Using Neighbors to Date Web Documents, Faculdade de Engenharia da Universidade do Porto, NESC-Porto, WIDM'07, Nov. 9, 2007, Lisboa, Portugal, Copyright 2007, ACM 978-1-59593-829-9/07/0011, 129-135.

(Continued)

*Primary Examiner* — Andrew Dyer
(74) *Attorney, Agent, or Firm* — BCF LLP

(57) ABSTRACT

A method for determining a creation time of a target page includes creating a page network having a plurality of pages including the target page and a plurality of links. Each of the source and destination pages for each link is one of the plurality of pages. Each page is a source page or a destination page for at least one of the links. A page network probability corresponding to a hypothetical creation time for the target page is determined. The page network probability is based on a link probability for each link of the plurality of links, the link probability being based on a creation time for the source page thereof and a creation time for the destination page thereof. A value of the hypothetical creation time providing the greatest value for the page network probability is determined, the value being the creation time for the target page.

16 Claims, 3 Drawing Sheets

(58) Field of Classification Search
USPC .................................................. 715/205–207
See application file for complete search history.

(56) References Cited

U.S. PATENT DOCUMENTS

| | | | |
|---|---|---|---|
| 7,499,965 B1* | 3/2009 | Chai ................ | G06F 17/30864 709/202 |
| 7,730,013 B2 | 6/2010 | Dill et al. | |
| 8,103,599 B2* | 1/2012 | Gao ................. | G06F 17/30864 706/11 |
| 8,239,350 B1 | 8/2012 | Vespe et al. | |
| 8,521,749 B2 | 8/2013 | Cutts et al. | |
| 8,543,668 B1 | 9/2013 | Long | |
| 8,589,790 B2* | 11/2013 | Seolas .............. | G06F 17/30899 715/234 |
| 9,426,946 B2 | 8/2016 | Ivershen | |
| 2001/0042064 A1 | 11/2001 | Davis et al. | |
| 2002/0052947 A1 | 5/2002 | Duimovich et al. | |
| 2003/0014399 A1 | 1/2003 | Hansen et al. | |
| 2005/0234877 A1 | 10/2005 | Yu | |
| 2006/0218134 A1* | 9/2006 | Simske ............. | G06F 17/30705 |
| 2006/0248456 A1 | 11/2006 | Bender et al. | |
| 2008/0040127 A1 | 2/2008 | Williams et al. | |
| 2008/0177994 A1 | 7/2008 | Mayer | |
| 2009/0204638 A1* | 8/2009 | Hollier ............. | G06F 17/30864 |
| 2010/0076910 A1* | 3/2010 | Gao ................. | G06Q 30/02 706/11 |
| 2011/0119220 A1* | 5/2011 | Seolas .............. | G06F 17/30899 706/47 |
| 2014/0068411 A1 | 3/2014 | Ross et al. | |
| 2014/0082482 A1* | 3/2014 | Seolas .............. | G06F 17/30899 715/234 |

FOREIGN PATENT DOCUMENTS

| | | |
|---|---|---|
| JP | 2007328478 A | 12/2007 |
| WO | 0237229 A2 | 5/2002 |

OTHER PUBLICATIONS

Chen et al., Web Page Publication Time Detection and its Application for Page Rank, Journal of Computational Information Systems6:1, 2010, pp. 279-285, Available at http://www.JofCI.org.

Dong et al., Towards Recency Ranking in Web Search, WSDM'10, Feb. 4-6, 2010, New York City, New York, USA., Copyright 2010 ACM 978-1-60558-889-6/10/02, 10 pages.

Lu et al., Automatic Extraction of Publication Time from News Search Results, Webscalers, 10 pages.

Kanhabua et al, Using Temporal Language Models for Document Dating, Dept. of Computer Science, Norwegian University of Science and Technology, Trondheim, Norway, 4 pages.

* cited by examiner

METHOD OF AND SYSTEM FOR DETERMINING CREATION TIME OF A WEB RESOURCE

CROSS-REFERENCE

The present application claims priority to Russian Patent Application No. 2014127288, filed Jul. 4, 2014, entitled "METHOD OF AND SYSTEM FOR DETERMINING CREATION TIME OF A WEB RESOURCE" the entirety of which is incorporated herein by reference. The present application is a continuation of International Patent Application no. PCT/IB2014/066333, filed on Nov. 25, 2014, entitled "METHOD OF AND SYSTEM FOR DETERMINING CREATION TIME OF A WEB RESOURCE", the entirety of which is incorporated herein by reference.

FIELD OF THE TECHNOLOGY

The present technology relates to methods and systems for determining creation time of a web resource.

BACKGROUND

A vast quantity of information is available via the internet. The available information includes a variety of content types, such as photos, video, audio and the like, and relates to a wide range of topics, such as but not limited to news, weather, traffic, entertainment, finance and the like. Existing web pages are continually being updated to include new information, and new web pages including new information are continually being created and accessed via the internet.

The information can be accessed using a wide range of electronic devices such as desktop computers, laptop computers, smartphones, tablets and the like. A user may either navigate to a particular web site directly by using the address for that web resource that she is wishing to access. For example, when the user wishes to do her on-line banking with the Royal Bank of Canada, the user may know to access the URL associated with the web site for the Royal Bank of Canada. In other circumstances, the user looking for information may not be aware of a particular web resource or a location thereof where the information can be found, and may instead perform a web search using a search engine, such as YANDEX™, GOOGLE™ YAHOO!™ or the like. As is known, the user enters a search query and the search engine provides a list of web resources that are responsive to the search query in what is known as a Search Engine Results Page or SERP, for short.

In order to enable fast, efficient retrieval of information via the internet, it is often important to know when a web resource is created. Creation time of web resources is often used in a variety of tasks related to information retrieval, such as web crawler scheduling, ranking of search results, sorting of search results and the like. Therefore, there is a need for a method and system for accurately determining the creation time for web resources.

SUMMARY

It is thus an object of the present technology to ameliorate at least some of the inconveniences present in the prior art.

According to a first broad aspect of the present technology, there is provided a method of determining a creation time of a target page, the method being executable at a server coupled to a communication network. The method includes creating a page network comprising a plurality of pages including the target page and a plurality of links. Each link of the plurality of links has a source page and a destination page. Each of the source page and the destination page is one of the plurality of pages. Each page of the plurality of pages is one of a source page and a destination page for at least one of the plurality of links. For the plurality of links, a page network probability corresponding to a hypothetical creation time for the target page is determined. The page network probability is based on a link probability for each link of the plurality of links. The link probability for each link is based on a creation time for the source page of the link and a creation time for the destination page of the link. A value of the hypothetical creation time providing the greatest value for the page network probability is determined, the value of the hypothetical creation time being the creation time for the target page.

In another aspect, a server is communicatively coupled to a plurality of hosts via a communication network, the server includes a processing module being configured to create a page network comprising a plurality of pages including the target page and a plurality of links. Each link of the plurality of links has a source page and a destination page, each of the source page and the destination page being one of the plurality of pages. Each page of the plurality of pages is one of a source page and a destination page for at least one of the plurality of links. The processing module is further configured to determine a page network probability for the plurality of links and corresponding to a hypothetical creation time for the target page. The page network probability is based on a link probability for each link of the plurality of links. The link probability for each link is based on a creation time for the source page of the link and a creation time for the destination page of the link. The processing module is further configured to determine a value of the hypothetical creation time providing the greatest value for the page network probability, the value of the hypothetical creation time being the creation time for the target page.

In the context of the present specification, unless specifically provided otherwise, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless specifically provided otherwise, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein.

In the context of the present specification, unless specifically provided otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless specifically provided otherwise, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, unless specifically provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
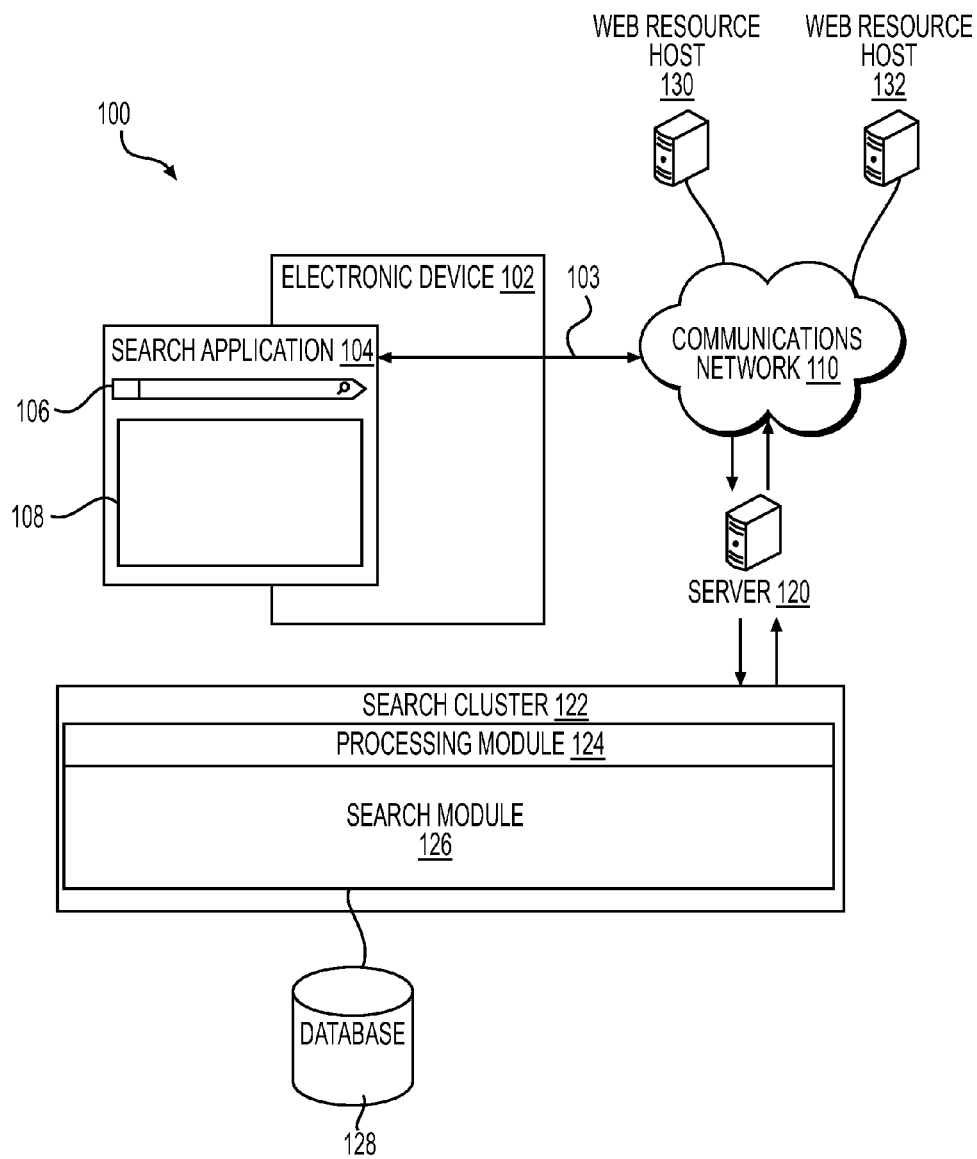
FIG. 1 is a schematic diagram of a network environment 100 implemented in accordance with an embodiment of the present technology.

With reference to FIG. 1, there is shown a schematic diagram of a network environment 100 suitable for implementing non-limiting embodiments of the present technology. It is to be expressly understood that the network environment 100 is depicted merely as an illustrative implementation of the present technology. Thus, the description thereof that follows is intended to be only a description of illustrative examples of the present technology. This description is not intended to define the scope or set forth the bounds of the present technology.

In some cases, what are believed to be helpful examples of modifications to the network environment 100 may also be set forth below. The modifications are described merely as an aid to understanding, and again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the network environment 100 may provide in certain instances simple implementations of the present technology, and that where such is the case they have been presented in this manner as an aid to understanding. As persons skilled in the art would understand, various implementations of the present technology may be of a greater complexity.

The network environment 100 includes an electronic device 102, and a communication network 110. The electronic device 102 is coupled to the communications network 110 via a communication link 103. The electronic device 102 is typically associated with a user (not depicted) and, as such, can sometimes be referred to as a "user electronic device" or a "client device". In the illustrated embodiment, the electronic device 102 is a laptop computer. The implementation of the electronic device 102 is however not limited to a laptop computer 102. As an example, the electronic device 102 may be implemented as a smartphone, a personal computer (desktops, laptops, netbooks, etc.), a wireless electronic device (a cell phone, a smartphone, a tablet and the like), as well as network equipment (a router, a switch, or a gateway). The general implementation of the electronic device 102 is known in the art and, as such, will not be described here at much length.

Although the present description is made with reference to the network environment 100 having one electronic device 102, it should be understood that the network environment 100 could include more than one electronic device 102.

The user electronic device 102 includes a user input interface (such as a keyboard, a mouse, a touch pad, a touch screen, microphone, and the like) for receiving user inputs. The electronic device 102 also includes a user output interface (such as a screen, a speaker, a printer and the like) for providing visual, auditory or tactile outputs to the user.

The user electronic device 102 includes a network communication interface (such as a modem, a network card and the like) for two-way communication over the communications network 110 via the communication link 103. The electronic device 102 also includes a processor coupled to the user input interface, the user output interface and the network communication interface. The processor is configured to execute various methods, including those described herein below. To that end the processor may store or have access to computer readable commands which, when executed, cause the processor to execute the various methods described herein. The user electronic device 102 comprises hardware and/or software and/or firmware, as is known in the art, to execute various applications. Some of the applications are configured to receive and transmit information via the communication network 110. Examples of such applications include a browser application, a search application, a music streaming application, a photo sharing application, and the like.

In the illustrated embodiment of the present technology, the communications network 110 is implemented as the Internet. In other embodiments of the present technology, the communications network 110 can be implemented differently, such as a wide-area communications network, a local-area communications network, a private communications network and the like.

The communication link 103 can also have various non-limiting implementations, and the particular implementation(s) of the communication link 103 for the user electronic device 102 will depend on how the electronic device 102 is implemented. In the illustrated embodiment of the present technology where the user electronic device 102 is implemented, as a laptop, the communication link 103 for the first electronic device 102 can be either wireless (such as the Wireless Fidelity, or WIFI™ for short, BLUETOOTH™ or the like) or wired (such as a Universal Serial Bus or USB-based connection). Furthermore, the communication link 103 coupling the electronic device 102 to the communication network 110 could include more than one type of link. For example, in this exemplary embodiment, the laptop 102 could be coupled to the network 110 via wireless as a well as a wired connection.

It should be expressly understood that implementations for the electronic device 102, the communication link 103 and the communications network 110 are provided for illustration purposes only. As such, those skilled in the art will easily appreciate other specific implementational details for the electronic device 102, 104, the communication link 103, 105 and the communications network 110. As such, by no means, examples provided herein above are meant to limit the scope of the present technology.

The electronic device 102 comprises hardware and/or software and/or firmware (or a combination thereof), as is known in the art, to execute a search application 104. Generally speaking, the purpose of the search application 104 is to enable the user (not depicted) to execute a search using the above-mentioned search engine server 120.

The implementation of the search application 104 is not particularly limited. One example of the search application 104 may be embodied in a user accessing a web site associated with a search engine to access the search application 104. For example, the search application can be accessed by typing in the URL associated with the corresponding search engine. It should be expressly understood that the search application 104 can be accessed using any other commercially available or proprietary search engine. Thus is in this exemplary embodiment, the search application 104 is executed via a browser application.

Generally, speaking, the search application 104 comprises a query interface 106 and a search result interface 108. The general purpose of the query interface 106 is to enable the user (not depicted) to enter a search query or a "search string". The general purpose of the search result interface 108 is to provide search results that are responsive to the user query entered into the query interface 106. The processing of the search query and the presentation of the search results will be described in detail below.

Also coupled to the communications network 110 is a search engine server 120 for conducting searches responsive to search queries received at the search engine server 120. The search engine server 120 is connected to the electronic device 102 via the communication network 110. The search engine server 120 could also be connected to other servers, such as but not limited to network configuration servers, network resource servers, application servers, and other network configuration servers, via the communication network 110.

The search engine server 120 can be implemented as a conventional computer server. In an example of an embodiment of the present technology, the search engine server 120 can be implemented as a Dell™ PowerEdge™ Server running the Microsoft™ Windows Server™ operating system. The search engine server 120 could also be implemented as other kinds of network equipment such as, but not limited to, a router, a switch, or a gateway, a base station and the like. The search engine server 120 can be implemented in any suitable hardware and/or software and/or firmware, or a combination thereof. In the depicted non-limiting embodiment of present technology, the search engine server 120 is a single server. In alternative non-limiting embodiments of the present technology, the functionality of the search engine server 120 may be distributed and may be implemented via multiple servers. The implementation of the search engine server 120 is well known. However, briefly speaking, the search engine server 120 comprises a network communication interface (not shown) structured and configured to communicate with the electronic device 102 and other devices coupled to the communications network 110. The search engine server 120 further comprises at least one computer processor (not shown) operationally connected with the communication interface and structured and configured to execute various processes to be described herein. The search engine server 120 may additionally be coupled to (or otherwise have access to) one or more modules, such as but not limited to a web crawling module, a sorting module and a ranking module, as are known in the art.

The search engine server 120 can be configured to execute web searches. Functionality of the search engine server 120 is generally known, but briefly speaking, the search engine 115 is configured to: (i) receive a search query from the electronic device 102; (ii) to process the search query (normalize the search query, etc); (iii) to execute a search for web resources that are responsive to the search query by accessing the index 122, the index 118 containing an index of crawled web resources and (iv) to return a ranked list of search results to the electronic device 102 for the search application to output to the user the SERP containing links to web resources that are responsive to the search query.

The search engine server 120 is communicatively coupled (or otherwise has access) to a search cluster 122. The general purpose of the search cluster 122 is to perform searches in response to the user queries inputted via the query interface 106 and to output search results to be presented to the user using the search results interface 108. What follows is a description of one non-limiting embodiment of the implementation for the search cluster 122. However, it should be understood that there is a number of alternative non-limiting implementations of the search cluster 122 possible. It should be also understood that in order to simplify the description presented herein below, the configuration of the search cluster 122 has been greatly simplified. It is believed that those skilled in the art will be able to appreciate implementational details for the search cluster 122 and for components thereof that may have been omitted for the purposes of simplification of the description.

Generally speaking the purpose of the search cluster 122 is to (i) conduct searches; (ii) execute analysis of search results and perform ranking of search results; (iii) group results and compile the search engine result page (SERP) to be outputted to the electronic device 102. The configuration of the search cluster 122 for executing searches is not particularly limited. Those skilled in the art will appreciate several methods and techniques for executing the search using the search cluster 122 and as such, some of the structural components of the search cluster 122 will only be described at a high level.

In some non-limiting implementations of the present technology, the search cluster 122 comprises a processing module 124. The processing module 124 can execute several searches, including but not limited to, a general search, a vertical search, a meta search, a multi-level search, and the like. The specific details of the different kinds of searches will not be discussed herein as the description is not intended to be limited to any one kind of search. Any type of search, using any type(s) of methods and techniques as will be understood by a skilled worker may be used to conduct the searches described herein. To that end, the processing module 124 comprises (or has access to) a search module 126.

The web search module 126 has access to a database 128 to conduct the web search(es). Although the database 128 is illustrated schematically herein as a single entity, it is contemplated that the database 128 can be implemented in a distributed manner, for example, the database 128 could have different components, each component being configured for a particular kind of search. It is also contemplated that the search module 126 could have access to a plurality of databases 128. Although the search module 126 is shown herein as being connected to a single database 128, the present technology is not intended to be limited to a single database 128.

The network environment 100 also includes a first web resource host 130 and a second web resource host 132. The first web resource host 130 hosts a plurality of web resources that can be accessed by connecting to the first web resource host 130 via the communication network 110. The second web resource host 132 hosts a plurality of web resources that can be accessed by connecting to the second web resource host 132 via the communication network 110. The first and second web resource hosts 130, 132 may also be connected to each other via the communication network 110, or even directly.

In the illustrated example, each of the web resource hosts 130, 132 is implemented as a separate server. Akin to the search engine server 120, each of the web resource hosts 130, 132 can be implemented as a conventional computer server. In an example of an embodiment of the present technology, each of the network resource hosts 130, 132 can be implemented as a Dell™ PowerEdge™ Server running the Microsoft™ Windows Server™ operating system. Each of the network resource hosts 130, 132 can also be implemented in any other suitable hardware and/or software and/or firmware or a combination thereof. In the depicted non-limiting embodiment of present technology, each web resource host 130, 132 is a single server. In alternative non-limiting embodiments of the present technology, the functionality of each web resource host 130, 132 may be distributed and may be implemented via multiple servers. It is also contemplated that the web resource hosts 130, 132 could be implemented by the same server.

It should also be understood that the web resource hosts 130, 132 and the web resources hosted by the hosts 130, 132 as presented herein are exemplary. The network environment 100 could include any number and kind of network resource servers and each network resource server could host any number and kind of network resources.

Each of the web resource hosts 130, 132 hosts a plurality of web pages as mentioned above. Each web page is created at a given time referred to as the creation time for the page. The creation time for a web page is defined as the time at which the web page is uploaded on the host, 130 or 132, and becomes accessible, via the communication network 110, from an electronic device 102 located remotely from the host 130 or 132.

Although, a web-page may be updated subsequent to its creation to include additional information, for the purposes of the method 500 described below the creation time of the web page is considered to be the original creation time, when the original version of the web page was first uploaded and made accessible via the communication network 110.

Often, the information about the creation time is incorporated into the content of the page or into the coded instructions for the creation of the page. For example, a web page may have a time stamp at the bottom of the page indicating the date and time of its creation. As another example, the HTML code used to create the web page may contain tags indicating the time when the page was uploaded. The web-page can be analyzed in various ways to determine the creation time of the page.

In general, the creation time for a given web page can be determined by a number of different methods. For example, the creation time of the page can be extracted by analyzing the URL (Universal Resource Location) of the web page to extract temporal expressions therefrom. The creation time can also be extracted by analyzing the content of the page, such as the text, images, and the like. The title of the document included in the HTML code or in the content of the page may contain creation time information. As another example, the HTML code for creating the web page may contain tags which indicate the creation time of the web page. Various machine-learned algorithms, pattern analysis algorithms and the like may be used to extract this creation time information. The creation times determined using different methods, such as those described above may, in some case, be prioritized in a certain order. For example, the creation time information included in the URL for a page may be considered to be more accurate and reliable than the creation time information obtained from the title or the content of the document. If the creation time information obtained by analysis of the web page includes a date and time of creation, and if the information obtained by analysis of one part of web page is not contradicted by information obtained by analysis of another part of the web page, the creation time of the web page is considered to be known and reliable. If however, the creation time information is noisy (analysis of different parts of the web page provide different creation times, for example) the creation time for the web page is considered to be unknown, or undetermined and needs to be verified.

The creation time information for a web page can also be roughly estimated by using incoming and outgoing links to the web page. For example, for a given source page having a plurality of outgoing links to different destination pages, the creation time for the source page can be estimated to be no earlier than the most recent one of the creation times of the destination pages of the outgoing links. Similarly, for a given page having an incoming link, the creation time for the page can be estimated to be no later than the creation time of the source page for that incoming link. If the given page has more than one incoming link, then the creation time for the page can be estimated to be no later than the most recent one of the creation times of the source pages for incoming links.

It is also contemplated that a link from a source page to a destination page could have its own link creation time which is distinct from the creation time of the source page. For example, a source page could be updated at a time subsequent to its creation time, to include a link to destination page. In this case, if the update time (i.e. link creation time) can be determined, for example, from an update time stamp included in the content of the page, then the link creation time can be taken into consideration for determining creation time of the destination document. However, the creation time information obtained from using the earliest incoming link and the latest outgoing link as described above, can at best provides a range for the creation time. For the purposes of applications such as scheduling a web crawler, sorting or rankling of search results, it is desirable to have more accurate information.

Figure 2:
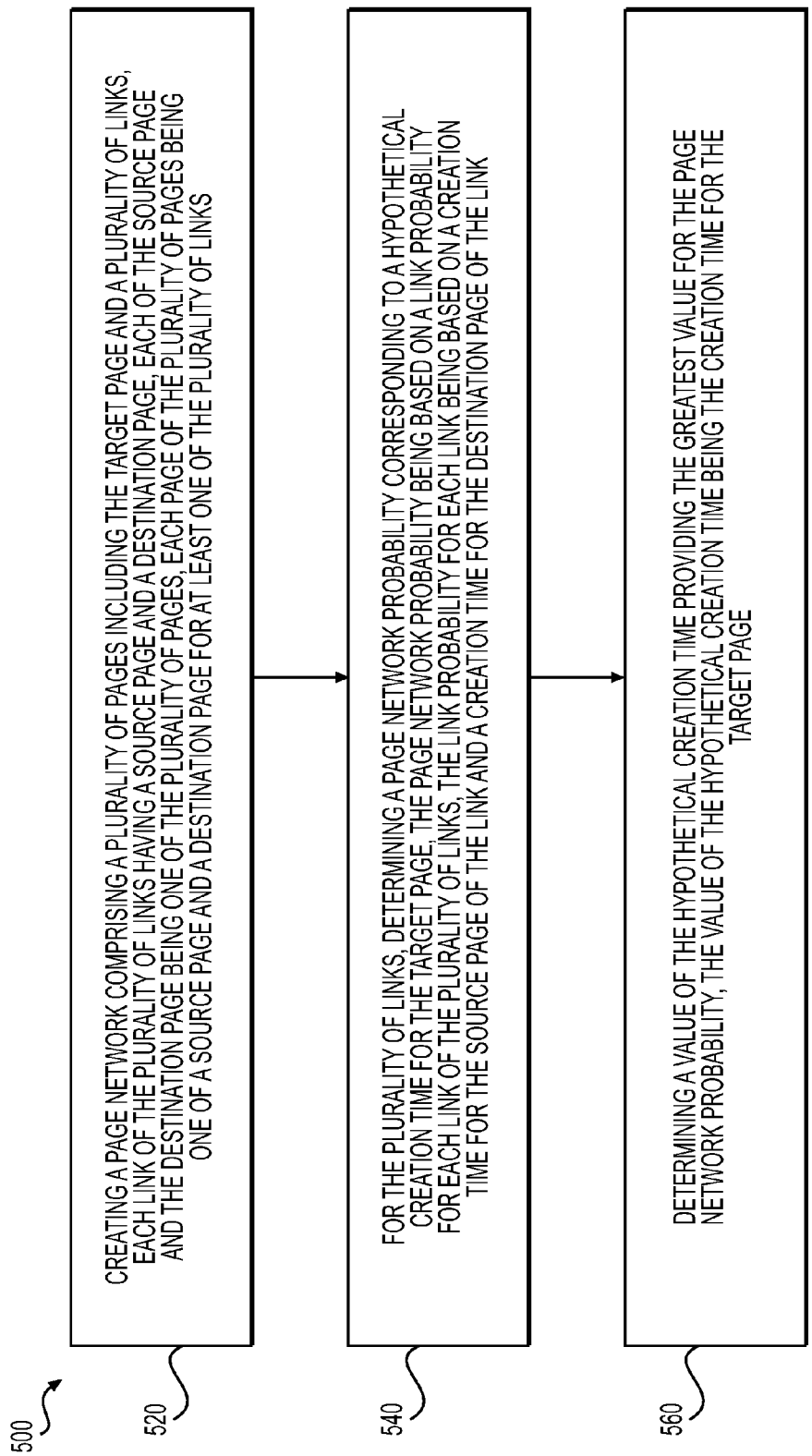
FIG. 2 is a schematic illustration of an exemplary page network in accordance with an embodiment of the present technology.

A method 500 for determining the creation time of a web page will now be described with reference to FIG. 2. The method 500 is a link-based method used when the above-mentioned methods do not yield any information related to the creation time of a page, or when the information obtained from using the above-mentioned methods provide only course-grained information, such as the month and year of creation, without the day and time of creation.

The method 500 is executed at a server, such as the search engine server 120, coupled to the communication network 110. The web page with the unknown creation time is referred to herein as a target page. Although the method 500 is described below with reference to a single target page, it should be understood that search engine server 120 may be aware of more than one target page having an unknown or undetermined creation time.

At step 520, a page network representation 300 of a page network 200 including a plurality of pages and a plurality of links therebetween is created. The page network representation 300 is a representation of an actual page network 200 including existing pages and actually existing links therebetween.

Figure 3:
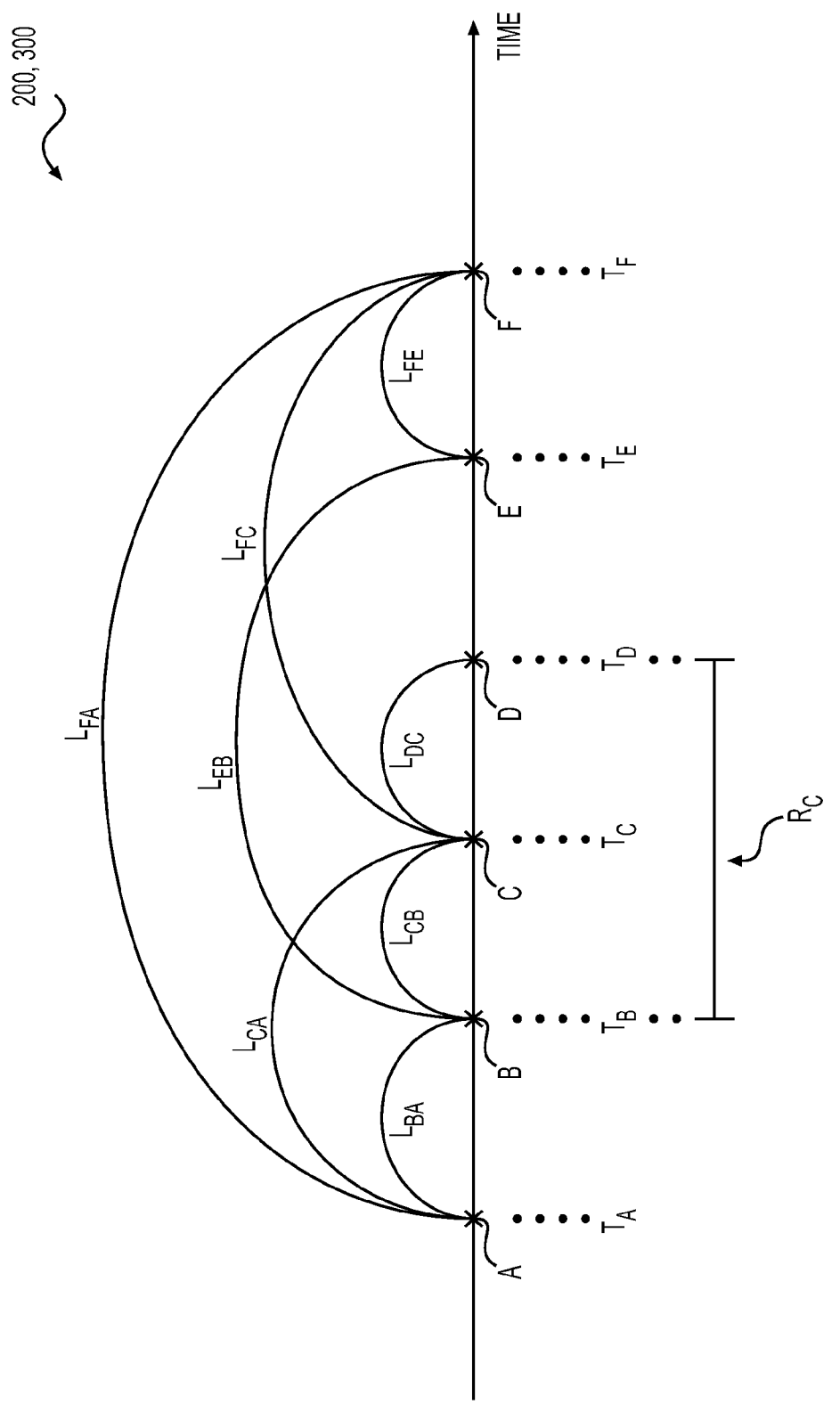
FIG. 3 is a flow chart illustrating a method for determining creation time for a web page in accordance with an embodiment of the present technology; and Appendices A and B include additional information related to the implementation of the method of FIG. 3.

FIG. 3 shows an exemplary page network representation 300 of an exemplary page network 200. The exemplary page network representation 300 is in the form of a diagram with the web pages A, B, C, D, E and F, represented as nodes (indicated by crosses) and lines connecting nodes indicating links between the corresponding pages. In this exemplary representation 300, the nodes (web pages) A, B, C, D, E and F, of the page network 200 are arranged sequentially in order of their creation times, whether known exactly or estimated approximately. In this exemplary page network representation 300, the nodes (web pages) A, B, C, D, E and F, are spaced uniformly regardless of the actual differences between their creation times. It is however contemplated that the spacing between consecutive nodes (web pages) could be indicative of the time difference between their creation times. It should also be understood that the page network representation 300 is exemplary and for illustration only. The page network representation 300 of the page network 200 could be in other forms, such as but not limited to pictorial, vector, matrix, graphical, and the like.

With reference to FIG. 3, the method 500 will be described below using an exemplary scenario of page network 200 including pages A, B, C, D, E and F. The exemplary page network 200 illustrated in FIG. 3 also has eight links $L_{CA}$, $L_{FA}$, $L_{CB}$, $L_{EB}$, $L_{DC}$, $L_{FA}$, $L_{FC}$, and $L_{FE}$, interconnecting the pages A, B, C, D, E and F.

In the described non-limiting implementation of the method 500, each of the pages A, B, C, D, E and F included in the page network 200 is linked to at least one other page A, B, C, D, E and F of the page network 200 by a link L. Thus, each page A, B, C, D, E and F included in the page network has at least one incoming or outgoing link. Each of the links L included in the page network 200 originates at one of the pages of the page network 200, and ends at another page A, B, C, D, E and F in the page network 200. In other words, for each link L included in the page network 200 created at step 520, both of the source page and the destination page are pages included in the page network. Thus, in this non-limiting implementation, any links from a page A, B, C, D, E and F of the page network 200 to a page not included in the page network 200 are omitted. Also omitted are self-referential links, i.e. links originating and ending at the same page, even if that page is included in the page network 200. In addition, the page network 200 created at step 520 includes all of the links between any one page A, B, C, D, E and F of the page network 200 and any other page A, B, C, D, E and F of the page network.

In a non-limiting implementation, all the pages A, B, C, D, E and F included in the page network 200 are hosted by the same host, such as a host 130, 132. It is however contemplated that the method 500 could be implemented using a page network 200 which includes pages from more than one host.

Each of the pages A, B, C, D, E and F has a respective creation time $T_A$, $T_B$, $T_C$, $T_D$, $T_E$ and $T_F$. In this exemplary scenario, the creation times $T_A$, $T_B$, $T_D$, $T_E$ and $T_F$ are known exactly, while the creation time $T_C$ for the page C is not known. For example, the year, month, day and time of creation of the pages A, B, C, D, E and F may be known exactly from analysis of the source code of the web pages A, B, C, D, E and F. Furthermore, the creation time $T_c$ of the web page C is not known exactly based on analysis of the page. Thus, in this exemplary scenario the page C is the target page for which the method 500 is used to determine creation time.

A rough estimation of the creation time $T_C$ can be made from the creation times of the source pages of incoming links to the target page C and creation times of the destination pages of the outgoing links from the target page C, as will be explained below.

In this exemplary scenario of FIG. 3, the target page C has two outgoing links, $L_{CA}$ and $L_{CB}$, to pages A and B respectively, and two incoming links, $L_{DC}$ and $L_{FC}$, from pages D and F respectively. A link for which the target page C is a source (outgoing link from page C) or a link for which the target page C is a destination (incoming link to target page C) is referred to hereinafter as a target page link for convenience. In the exemplary scenario of FIG. 3, the links $L_{CA}$, $L_{CB}$, $L_{FC}$, and $L_{DC}$, are the target page links.

With reference to FIG. 3, in this exemplary scenario, looking at the outgoing target page links $L_{CA}$ and $L_{CB}$, the creation time $T_C$ of the target page C can be estimated to be no earlier than the creation time $T_B$ of the page B which is the more recently created one of the destination pages for the outgoing target links $L_{CA}$ and $L_{CB}$. Similarly, the page D is the earliest of the destination pages for the incoming target page links $L_{DC}$ and $L_{FC}$. Thus, the creation time $T_C$ of the target page C can be estimated to be no later than the creation time $T_D$ of the page D. Based on the above analysis, a range $R_C$ for the creation time $T_C$ of the target page C can be estimated to be between $T_B$ and $T_D$.

With reference to FIG. 3, the page network 200 also has other links $L_{BA}$ from page B to page A, $L_{EB}$ from page E to page B, $L_{FE}$ from page F to page E, and $L_{FA}$ from page F to page A. The pages A to F may have other links to or from pages not included in the page network 200, however, as mentioned above, these links to pages excluded from the page network 200 are not considered in this non-limiting implementation of the technology but may be considered in other implementations.

After creating the page network 200, the method 500 proceeds to step 540.

At step 540, a page network probability $P_{network}$ is determined for the occurrence of the page network 200. The page network probability $P_{network}$ is determined from the respective individual link probabilities for the occurrence of each of the links in the page network 200. Thus, for the exemplary page network 200 illustrated in FIG. 3 having the eight links $L_{CA}$, $L_{FA}$, $L_{CB}$, $L_{EB}$, $L_{DC}$, $L_{FA}$, $L_{FC}$, and $L_{FE}$, the page network probability $P_{network}$ is a product of the respective eight individual link probabilities $P_{CA}$, $P_{FA}$, $P_{CB}$, $P_{EB}$, $P_{DC}$, $P_{FA}$, $P_{FC}$, and $P_{FE}$.

In the method 500, the link probability of having a link from a source page to a destination page is assumed to depend on the age difference a between the source and destination pages. For example, assuming that page C was created later than page B, the probability $P_{CB}$ of having a link from page C to page B depends on the age difference $a_{CB}$ between their respective creation times, where $a_{CB} = (T_B - T_C)$.

In the illustrated implementation, the link probability P of having a link from one page to another page is inversely exponentially proportional to their age difference. Thus, for example, the probability $P_{CB}$ of the link from page C to page B is proportional to $e^{-(T_B-T_C)/\tau}$ In other words, the probability $P_{CB}$ of the link from page C to page B decreases exponentially with their age difference $(T_B-T_C)$. The constant t is a decay parameter discussed below in further detail.

Since the creation time $T_C$ for the target page is unknown, a hypothetical value is assigned to the creation time $T_C$ to determine the individual and overall link probability $P_{network}$ for the page network 200. The hypothetical value assigned to the creation time Tc of the target page C is referred to as the hypothetical creation time. If the value of the hypothetical creation time is changed, the theoretical link probability for the occurrence of each of the target page links changes accordingly, as does the page network probability $P_{network}$ for the occurrence of all of the links included in the page network 200. This dependence of the page network probability $P_{network}$ on the hypothetical creation time of the target page C can be used to determine the actual creation time $T_C$ for the target page C as will be described below.

At step 540, in the creation of the page network representation 300, the server 120 assigns hypothetical values for the creation time of the target page C. The hypothetical creation times can be assigned based on the rough estimations, such as the time range $R_C$ for creation time $T_C$ as discussed above. As mentioned above, although the method 500 is being described herein, for convenience, with the assumption that the page network 200 has only one target page C with an unknown creation time $T_C$, the method 500 is not limited to this assumption. The page network 200 can have more than one target page with an unknown creation time.

At step 560, the actual creation time $T_C$ of the target page C is determined by determining the hypothetical creation time that maximizes the overall probability $P_{network}$ for the occurrence of the page network 200.

In some other non-limiting implementations, a gradient descent method is used to determine the value of the creation time for which the page network probability $P_{network}$ is a maximum. The method 500 is not to be limited to any particular method for finding the maxima of the page network probability $P_{network}$ as a function of hypothetical creation time in order to determine the actual creation time for the target page.

In some implementations, the hypothetical creation time that maximizes the page network probability $P_{network}$ is determined by assigning a plurality of different hypothetical values to the creation $T_c$, calculating the page network probability $P_{network}$ for each one of the assigned hypothetical creation times, and determining which one of the hypothetical values of creation times provides the greatest value for the overall probability $P_{network}$ for the page network 200.

The plurality of hypothetical creation times assigned could be based on potential creation times or rough estimations of creation times obtained from analysis of the web page as described above. For example, a semantic analysis of the content of the target page C could have detected a date written as 071112013 as the creation date for the target page C, which could be narrowed down to two different possible dates Jul. 11, 2013 or Nov. 7, 2013. Each of these dates could be assigned as the hypothetical creation time for the target page, and the overall page network probability $P_{network}$ could be evaluated for each of the two dates. The date corresponding to the higher overall page network probability $P_{network}$ would then be determined to be the actual creation time $T_C$ for the target page.

Decay Parameter (τ)

The decay parameter, τ, is generally indicative of how quickly pages becomes obsolescent, or of the rate at which popularity of a page decays. The greater the value of the decay parameter for a page, the faster the page becomes obsolescent. In general, each page has its own characteristic decay parameter τ. In the illustrated implementation, the decay parameter τ is characteristic of the host. All the pages hosted by a particular host are characterized by the same decay parameter τ. In the exemplary scenario of FIG. 3, since all the pages A to F of the page network 200 belong to the same host, the decay parameter is the same for all the pages. It is further contemplated that the decay parameter could be characteristic of a group of hosts, or of a particular page network, such as the page network 200.

The decay parameter τ is generally determined using pages with known creation times. In the illustrated implementation of the method 500, the data is grouped in the following way: for a given integer i, the number $x_i$ of links between pages having an age difference between (i−1) and i days is tabulated. The decay parameter is then obtained from the slope of the line on a logarithmic plot of (i, log $x_i$) It is however contemplated that the decay parameter could be determined using other methods.

Quality Parameter

In some implementations, each of the pages A, B, C, D, E and F has a respective quality parameter $Q_A$, $Q_B$, $Q_C$, $Q_D$, $Q_E$ and $Q_F$.

In some non-limiting implementations, the link probability P for each link L is also based on the quality parameter Q of the destination page of the link L, in addition to the age difference between the source page and the destination page.

The quality parameter Q of a page is indicative of its usefulness or popularity. A page that includes information that is useful, or of interest, to a large number of users has a higher quality parameter than a page that includes information that is less useful, or of interest to a smaller number of users. Thus, generally, a page that has a higher quality parameter has a greater number of incoming links than a page that has a lower quality parameter. In some non-limiting implementations, the value of the quality parameter for a page is based on the number of incoming links to the page.

It is however contemplated that, in addition to using the number of incoming links or instead of using the number of incoming links, the quality parameter Q could also be based on other criteria such as, but not limited to, the number of views to a page.

For example, a page having information related to the rock group Beatles would have a higher quality parameter and a greater number of incoming links than a page having information related to Hungarian provincial elections.

The quality parameter for a page could also depends on other factors such as the popularity of the host where the page is hosted.

In some non-limiting implementations, the link probability P for the occurrence of a link from a source page to a destination page is generally proportional to the quality factor Q of the destination page.

In some non-limiting implementations, the link probability P for the occurrence of a link from a source page to a destination page is generally proportional to the quality factor Q of the destination page in addition to being a function of the age difference between the source and destination pages. In some further implementations, the link probability L for the occurrence of a link from a source page to a destination page is generally proportional to $Q \cdot e^{-a/\tau}$.

Thus, the page network probability $P_{network}$ is a function of the quality parameter of each one of the pages in the page network 200. This relationship between the link probability P and the quality parameter can also be used to determine the quality parameter for one or more pages of the page network 200. In general, the actual quality parameter for a page is one that maximizes the page network probability $P_{network}$.

For example, in some non-limiting implementations, for each of the pages of the page network 200, a hypothetical value is assumed for the quality parameter Q for the page. For example, the hypothetical value of the quality parameter for a page can be assigned initially based on the number of incoming links to that page. It is contemplated that the hypothetical value for the quality parameter can also be assigned based on criteria other than the number of incoming links. The overall page network probability $P_{network}$ is then determined based on the quality parameter Q. The hypothetical quality parameter(s) of one or more pages can be adjusted to maximize the page network probability $P_{network}$. The actual quality parameter Q for a page is the value that maximizes the page network probability $P_{network}$. As discussed above for the determination of the creation times, the value of the quality parameter based on the maxima of the page network probability $P_{network}$ function can be determined using a method such as the gradient descent method. The method 500 is however not limited to any one particular method for finding the value of the quality parameter Q for one or more pages that maximizes the age network probability $P_{network}$.

In a non-limiting implementation, all of the unknown creation times of the target pages of a page network 200 and quality parameter Q for each one of the pages is determined simultaneously. It is however contemplated that the quality parameter Q for some of the pages could be determined separately from the creation times of some of the pages.

The method 500 described above can be used to simultaneously determine the creation times for all of the pages in a page network 200 whether or not the creation time information can also be determined based on an analysis of the web page itself. Furthermore, the method 500 described above can be used to simultaneously determine the creation times and the quality parameters for all of the pages in a page network 200.

Further details about the method 500 for determination of creation times for one or more pages in a page network can be found in Appendices A and B.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of determining a creation time of a target page, the method being executable at a server coupled to a communication network, the method comprising:

creating a page network representation of a plurality of pages including the target page and a plurality of links, the creation time of the target page being unknown, each page of the plurality of pages of the page network representation being linked to at least one other page of the plurality of pages of the page network representation, each link of the plurality of links of the page network representation having a source page and a destination page, each of the source page and the destination page for each link of the plurality of links of the page network representation being one of the plurality of pages, each page of the plurality of pages of the page network representation being one of a source page and a destination page for at least one of the plurality of links, the plurality of links comprising an outgoing target link, the outgoing target link being a link for which the source page is the target page, the outgoing target link having a destination page defining an outgoing target link creation time;

assigning a plurality of hypothetical values for the creation time of the target page having the unknown creation time, an earliest one of the plurality of hypothetical values being one of:

the outgoing target link creation time; and a time later than the outgoing target link creation time;

determining a respective page network probability for the page network representation corresponding to each one of the plurality of hypothetical values for the creation time of the target page, the respective page network probability corresponding to a given one of the plurality of hypothetical values for the creation time of the target page being indicative of an occurrence of the page network having the plurality of links and the plurality of pages including the target page with the given one of the plurality of hypothetical values for the creation time of the target page, the page network probability being based on a respective link probability for each link of the plurality of links of the page network representation, the link probability for each link being indicative of an occurrence of the link from the source page of the link to the destination page of the link, the link probability for each link being based on a creation time for the source page of the link and a creation time for the destination page of the link;

identifying a particular one of the plurality of hypothetical values of the creation time of the target page that corresponds to a greatest one of the respective page network probability; and assigning the particular one of the plurality of hypothetical values of the creation time to the creation time for the target page.

2. The method of claim 1, wherein identifying the particular one of the plurality of hypothetical values of the creation time of the target page comprises using a gradient descent method.

3. The method of claim 1, wherein the plurality of hypothetical values of the creation time assigned for the target page is based on at least one of:
  a link for which the target page is a source page; and
  a link for which the target page is a destination page.

4. The method of claim 1, wherein:
  the plurality of links comprises an incoming target link, the incoming target link being a link for which the destination page is the target page, the incoming target link having a source page defining an incoming target link creation time; and
  assigning a plurality of hypothetical values for the creation time of the target page comprises:
    assigning a latest one of the plurality of hypothetical values to be one of:
      the incoming target link creation time; and
      a time earlier than the incoming target link creation time.

5. The method of claim 1, wherein:
  the plurality of links comprises:
    an incoming target link, the incoming target link being a link for which the destination page is the target page, the incoming target link having a source page defining an incoming target link creation time; and
  assigning a plurality of hypothetical values for the creation time of the target page comprises:
    assigning the plurality of hypothetical values to be in a range between the outgoing target link creation time and the incoming target link creation time, inclusively.

6. The method of claim 1 wherein, the link probability for each link is further based on a quality parameter for the destination page for the link.

7. The method of claim 6, wherein the quality parameter for each page is assigned based on the number of incoming links to the page.

8. The method of claim 7, wherein the quality parameter assigned for each page is further indicative of a quality parameter of a corresponding host hosting the page.

9. The method of claim 6, further comprising:
  for at least one page of the plurality of pages, determining the quality parameter based on the page network probability.

10. The method of claim 9, wherein determining the quality parameter for the at least one page based on the page network probability comprises:
  assigning a plurality of hypothetical quality parameters for the page, for each one of the plurality of hypothetical quality parameters:
    determining a link probability for each link; and
    determining a page network probability,
  the quality parameter for the at least one page being the one of the plurality of hypothetical quality parameters corresponding to the greatest value of the determined overall probability.

11. The method of claim 10, further comprising determining the greatest one of the page network probability using a gradient descent method.

12. The method of claim 10, further comprising:
  determining simultaneously the creation time for the target page and the quality parameter for the at least one page.

13. The method of claim 1, further comprising:
  determining a decay parameter for the plurality of pages, the link probability for each link being further based on the decay parameter.

14. The method of claim 1, wherein the target page is a plurality of target pages.

15. The method of claim 1, wherein all of the plurality of pages of the page network are hosted by a common host.

16. A server communicatively coupled to a user electronic device and a plurality of hosts via a communication network, the server including a processing module being configured to:
  create a page network representation of a plurality of pages including a target page and a plurality of links, a creation time of the target page being unknown, each page of the plurality of pages of the page network representation being linked to at least one other page of the plurality of pages of the page network representation, each link of the plurality of links of the page network representation having a source page and a destination page, each of the source page and the destination page being one of the plurality of pages, each page of the plurality of pages of the page network representation being one of a source page and a destination page for at least one of the plurality of links, the plurality of links comprising an outgoing target link, the outgoing target link being a link for which the source page is the target page, the outgoing target link having a destination page defining an outgoing target link creation time;
  assign a plurality of hypothetical values for the creation time of the target page having the unknown creation time, an earliest one of the plurality of hypothetical values being one of:
    the outgoing target link creation time; and
    a time later than the outgoing target link creation time;
  determine a respective page network probability for the page network representation corresponding to each one of the plurality of hypothetical values for the creation time of the target page,
  the respective page network probability corresponding to a given one of the plurality of hypothetical values for the creation time of the target page being indicative of an occurrence of the page network having the plurality of links and the plurality of pages including the target page with the given one of the plurality of hypothetical values for the creation time of the target page, the page network probability being based on a respective link probability for each link of the plurality of links of the page network representation, the link probability for each link being indicative of an occurrence of the link from the source page of the link to the destination page of the link, the link probability for each link being based on a creation time for the source page of the link and a creation time for the destination page of the link;

identify a particular one of the plurality of hypothetical values of the creation time of the target page that corresponds to the greatest one of the respective page network probability; and assign the particular one of the plurality of hypothetical values of the creation to the creation time for the target page.

* * * * *